Figure 1:
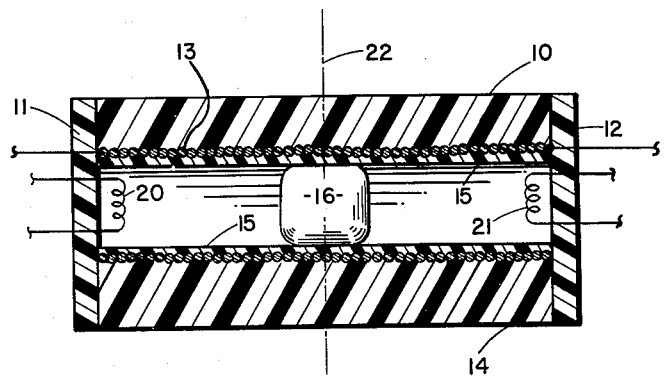

*INVENTORS*
WILBUR L. ZINGERY
ROBERT WILLING
BY *Allan Rothenberg*
ATTORNEY

United States Patent Office 3,094,878
Patented June 25, 1963

3,094,878
INSTRUMENT BALANCER
Wilbur L. Zingery, Long Beach, and Robert Willing, Anaheim, Calif., assignors to North American Aviation, Inc.
Filed Dec. 19, 1960, Ser. No. 76,973
7 Claims. (Cl. 74—5.7)

This invention concerns balancing apparatus and particularly relates to apparatus for remotely adjusting the balance of a sensitive instrument.

Instruments with rotating parts, and particularly such instruments as gyroscopes and acceleration sensitive devices which are employed for attitude reference and navigation purposes, exhibit exceeding sensitivity to lack of static balance. For example, a gyroscope may typically incorporate a rotor journaled in a float which is in turn mounted to and within the gyro case by means of low coercion output axis bearings. A serious source of error in such an instrument, causing undesired drift (e.g., angular rotation about an input axis) is the lack of static balance of the float itself about the output axis. For this reason the gyro float is generally provided with a number of threadedly mounted elements which can be adjusted in directions normal to the output axis to move the center of gravity of the float into coincidence with the output axis.

The balance is extremely critical and the increments of adjustment required are small. Adjustment of balance in increments of 0.001 mg.-cm. up to as much as 1,000 mg.-cm. is often required. Lack of balance is typically indicated by deviation from a calculated value of torquer current required to cage the gyro. Thus, at present the torquer current is observed as error or deviation from a calculated value. The gyro is de-energized, at least partially disassembled in order to provide access to the float, and the balance screws are manually adjusted by a repeated trial and error process until the desired balance is achieved. Such a procedure is delicate, tedious and time consuming, requiring in some instances as much as a full day for a precision instrument. The location of the adjustment screws inside the case prevents adjustment while the gyro is in its normal operating condition. It is not possible, for this reason, to make the adjustment while observing the unbalance. It is not possible to make the adjustment without touching the instrument and thus upsetting the balance.

Accordingly, it is an object of this invention to provide a remotely controlled precision balancer.

In carrying out the principles of this invention in accordance with a preferred embodiment thereof, there is provided a sealed cylinder having a piston movably mounted therein and including on the inside surface thereof a viscous thermo-plastic material which normally locks the piston in position in the cylinder and at the same time provides for a seal of the pressure differential on each side of the piston. A heater is provided to heat the thermoplastic material and release the locking effect thereof. The space within the cylinder on each end of the piston is sealed and filled with a suitable material such as air, for example, which has the temperature thereof selectively controlled on either side of the piston in order to provide a differential pressure across the piston to effect the desired motion thereof under control of the differentially operable heaters. A feature of the invention resides in the mode of application to a gyro or other instrument which ordinarily has a number of motor leads connecting to the float which carries the motor stator. There may be provided an arrangement which eliminates the requirement for additional lead-in wires to the movable element or float by employing the motor leads themselves to conduct the balancer control signals. Thus, the difficulties and disadvantages of lead-in wire connections to the movable element of the instruments are not increased while remote electrical control is still achieved.

In the laboratory or manufacturing facility where instrument balance is normally carried out, it may be convenient to employ a manual remote electrical control of the balance, as will be described in connection with the disclosed embodiment. However, it will be appreciated that for use in field operations where less experienced personnel and less complete facilities are available, the principles of the invention may be applied to an automatic balance operation wherein a signal is derived indicative of the lack of unbalance and employed to control the several heater elements of the described manually controlled embodiment whereby automatic servo control of balancing may be achieved.

It is an object of this invention to provide fine balancing with improved acuracy and reliability.

Another object of the invention is to balance an instrument without physical contact therewith.

Still another object of the invention is to balance an instrument while it is in normal operation.

A further object of this invention is to provide an electrically controllable instrument balancer which requires no additional lead-in wires to the instrument.

Another object of the invention is to provide a remotely controllable balancer capable of requisite range and precision adjustment which is operable within an hermetically sealed device while at operating temperatures and under normal operating conditions.

Figure 2:
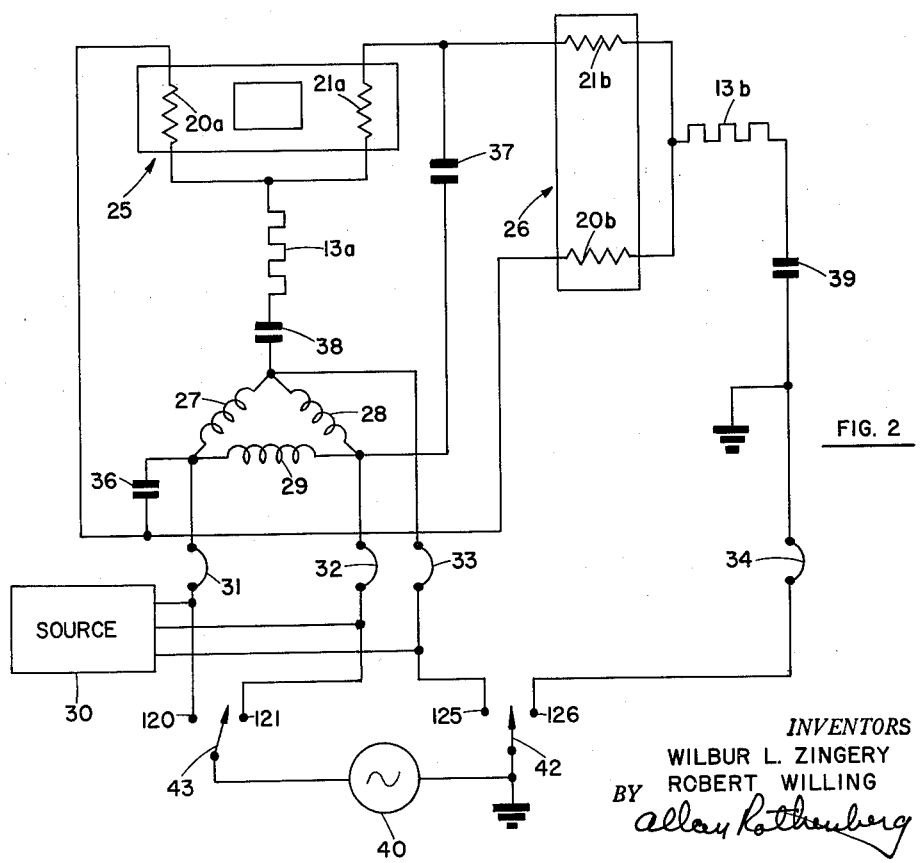

These and other objects of the invention will become apparent from the following description taken in connection with the accompanying drawings in which:

FIG. 1 is a longitudinal cross-sectional view of a balancer constructed in accordance with the principles of this invention; and FIG. 2 is an electrical schematic of the circuitry and circuit connections of a pair of balancers of the type illustrated in FIG. 1.

In the drawings like parts are designated by like reference numerals.

The balancer illustrated in FIG. 1 comprises a cylinder 10 having end walls 11 and 12 which provide an hermetically sealed elongated chamber internally of the cylinder. The balancer, in a typical embodiment, is of small dimensions, being on the order of one inch in length and one-quarter of an inch in diameter. The cylinder includes a heater winding 13 wound about an inner surface of the cylinder and an outer insulating wall 14. Coated on the inner surface of the cylinder is a continuous layer 15 of a viscous thermoplastic resin composition such as, for example, polyethylene terephthalate-thickened phenyl benzoate, or perfluoroheptyl-2,5-dibromo benzoate.

Most conveniently the cylinder will be formed so as to cause the heater 13 itself to comprise the wall of the instrument whereby the heater will be in intimate contact with the viscous locking resin 15, and heat may be rapidly transferred thereto. Thus, the cylinder may be formed by winding a single layer of heater wire on a suitable mandrel or rod of desired diameter, then covering the winding with a permanent cement forming the insulation 14 and removing the rod. The interior of the heater winding or cylinder may then be coated with the viscous material.

Mounted for translational motion within the cylinder is a mass 16 which is closely fitted to the walls of the cylinder and is locked in place when the viscous material is at relatively low temperature, in its frozen or solidified condition. Suitably secured to each end wall 11 and 12, as by cement, is a driving heater coil 20, 21. End walls 11 and 12, together with heater coil affixed thereto are cemented or otherwise secured to the cylinder body to provide a pair of sealed end chambers at each end of the cylinder between the mass 16 and the end walls. The interior of the cylinder is filled with a gas which obeys Boyle's and Charles's laws, such as air, helium and nitrogen for example.

If one end of the cylinder is held at a constant temperature, the temperature of the instrument on which the balancer is mounted, for example, and the other end has the heater thereof energized, the temperature, and therefore the pressure, on one side of the piston will increase to provide a pressure differential across the piston 16. If the heater 13 now is energized to melt the viscous material, the mass 16 will be moved in one direction or another in accordance with which one of the heaters 20 and 21 has been energized. In the balancing of a sensitive instrument of this type it is of great importance that the balance, once achieved, remains fixed. Thus, the action of the viscous material 15, when in frozen or solidified condition, is significant in that it locks and rigidly secures the mass to the cylinder. Further, surface tension of the viscous material acts as a barrier to prevent transmission of pressure from one side of the mass to the other within the cylinder.

For the balancing of a gyro, for example, which has an output axis directed along a line indicated at 22 in FIG. 1, the balancer illustrated in this figure would be secured to the float or other corresponding movable element of the gyro with the longitudinal axis of the cylinder normal to the output axis 22. For complete balance about axis 22 a second balancer identical to the first will be employed, with its cylindrical axis preferably at right angles to both the output axis 22 and to the axis of the cylinder of the first balancer. Thus, a combination of motions of the masses of the two balancers would provide for displacement of the center of gravity of the instrument in any direction at right angles to the output axis of the instrument. Both balancers may be secured to the instrument as may be deemed suitable or convenient.

The float of a gyro generally incorporates the three-phase stator of an hysteresis synchronous motor of which the rotor comprises a part of the gyro rotor itself. Thus, there are generally a minimum of three leads (and often as many as six or eight) carried to the instrument movable element (on which the balancers of this invention are to be mounted) from a power source external to the instrument. There is an additional lead for the purpose of grounding the movable element. With such an arrangement, as illustrated in FIG. 2, a pair of balancers 25 and 26 may be coupled to existing gyro motor windings 27, 28 and 29. Windings 27 through 29 are connected to a motor driving source 30 by means of flexible lead-in wires 31, 32, 33. Flexible lead 34 is provided for the ground of the movable element.

Balancers 25 and 26 include the unlocking heater windings 13a and 13b corresponding to the winding 13 of FIG. 1, and the driving heater winding 20a, 21a, 20b, 21b corresponding to the heater windings 20, 21 of FIG. 1. For the purpose of enabling common use of the lead-in wires which already exist in the instrument, the several existing leads 31, 32, 33, and 34 are connected to the balancers by means of relatively small capacitors 36, 37, 38, and 39 whereby the balance heaters can be operated by a source 40 of high frequency current such as 100 kc., for example, which is substantially greater than the usual 400 cycles per second supplied by source 30 to the motor windings 27 through 29. With this arrangement the low frequency 400-cycle motor signal is blocked from the balancer by means of the capacitors while the motor windings themselves, because of their inductance, will not respond to the high frequency signal from source 40.

The heater energizing source 40 is selectively connected to operate either heater 20a or 21a of balancer 25, or heater 20b or 21b of balancer 26 by means of a pair of switches 42, 43 which in the embodiment described herein may be operated manually by an operator who is reading the unbalance indication of the instrument. To control the balancer 25, switch 42 is thrown to connect one side of the source 40 with a terminal 125. To move the mass of balancer 25 to the right in the illustration of FIG. 2, switch 43 is thrown to connect the other side of source 40 to switch terminal 120 whereby current will flow from terminal 120 through capacitor 36, through driving heater 20a, through locking heater 13a, thence through capacitor 38 and terminal 125 of switch 42, back to the source 40. Conversely, to move the mass of balancer 25 to the left, switch 43 is thrown to contact terminal 121 while switch 42 remains in contact with terminal 125. With this arrangement current from source 40 will flow through locking heater 13a as before but this time will flow through the other element 21a. Similarly, for operating balancer 26, switch 42 is thrown to contact terminal 126 and switch 43 is thrown to contact either terminal 120 or 121 depending upon the desired direction of the motion of the mass of the balancer.

It will be seen that there has been provided a simple remotely operable balancer which is capable of the required range and precision of adjustment without disturbing the normal operation of the gyro or other instrument upon which it is mounted and which can conveniently utilize the existing lead-in wires of the instrument.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A remotely controllable balancer comprising a sealed cylinder having a normally solidified material on the inner surface thereof, a piston in said cylinder locked in position by said material, a heater on the cylinder for selectively melting said solidified material to release the piston, said cylinder being filled with a gas which obeys Boyle's and Charles's laws, and heater means positioned at one end of said cylinder for controlling temperature and pressure between one end of said cylinder and said piston.

2. A remotely controllable balancer comprising a sealed cylinder having a viscous thermoplastic material on the inner surface thereof, said cylinder being filled with a gas which obeys Boyle's and Charles' laws, a piston in said cylinder locked in position by said material, a heater on the cylinder for selectively melting said material to release the piston, and heaters at each end of the cylinder for differentially controlling temperature and pressure of said gas within the cylinder between the piston and the ends of said cylinder.

3. In combination with an instrument having a motor and lead-in wires therefor, a remotely controllable balancer comprising a sealed cylinder having a viscous thermoplastic material on the inner surface thereof, a piston in said cylinder locked in position by said material, a heater on the cylinder for selectively melting said material to release the piston, said cylinder being filled with a gas which obeys Boyle's and Charles' laws, a heater at one end of the cylinder for controlling temperature and pressure of said gas within the cylinder between the piston and one end of said cylinder, heater control means coupled with said lead-in wires, and capacitative means coupling said lead-in wires to said heaters.

4. A remotely controllable balancer comprising a cylinder having a piston slidably mounted therein, locking means for releasably locking the piston to the cylinder, said cylinder being filled with a gas which obeys Boyle's and Charles' laws, driving means for effecting differential control of temperature and pressure of said gas within the cylinder at opposite sides of the piston, and means for controlling said locking and driving means.

5. In combination with an instrument having a motor and lead-in wires therefor, a remotely controllable balancer comprising a cylinder having a piston slidably mounted therein, locking means for releasably locking the piston to the cylinder, said cylinder being filled with a gas which obeys Boyle's and Charles' laws, driving means for effecting differential control of temperature and pressure of said gas within the cylinder at opposite sides of the piston, and means for controlling said locking and driving means, said controlling means including apparatus remote from said instrument, and means including at least some of said lead-in wires for connecting said remote apparatus to said locking and driving means.

6. In combination with a sensitive instrument to be balanced about an axis thereof, a remotely controllable balancer comprising a sealed cylinder fixed to the instrument, said cylinder including a number of turns of heater winding in intimate relation with the cylinder wall, a piston in the cylinder, a viscous thermoplastic resin coating the inner surface of the cylinder for preventing passage of gas pressure past the piston and releasably locking the piston to the cylinder, said cylinder being filled with a gas which obeys Boyle's and Charles' laws, first and second heater filaments mounted within the cylinder at opposite ends thereof for controlling temperature and pressure of said gas on either side of the piston, and means for selectively energizing said heater winding and said heater filaments.

7. In combination with a sensitive instrument having a motor and lead-in wires coupling the motor to a power source of a first frequency, a balancer comprising a sealed cylinder fixed to the instrument, said cylinder including a number of turns of heater winding in intimate relation with the cylinder wall, a piston in the cylinder, a viscous thermoplastic resin coating the inner surface of the cylinder for preventing passage of gas pressure past the piston and releasably locking the piston to the cylinder, first and second heater filaments mounted within the cylinder at opposite ends thereof for controlling temperature and pressure on either side of the piston, a number of capacitors connecting said heater filaments and heater winding to said motor lead-in wires, a balance control power source of a second frequency, and means for selectively coupling said balance control source to said lead-in wires.

References Cited in the file of this patent

UNITED STATES PATENTS

| | | |
|---|---|---|
| 2,384,838 | Kellogg | Sept. 18, 1945 |
| 2,859,626 | Maze | Nov. 11, 1958 |
| 2,878,679 | Bouchard et al. | Mar. 24, 1959 |
| 2,909,930 | Erdley et al. | Oct. 27, 1959 |